(12) United States Patent
Malik (10) Patent No.: US 7,071,940 B2
(45) Date of Patent: Jul. 4, 2006

(54) INTERACTIVE DATA VISUALIZATION AND CHARTING FRAMEWORK WITH SELF-DETECTION OF DATA COMMONALITY

(75) Inventor: Shadan Malik, Pittsburgh, PA (US)

(73) Assignee: IVIZ, Inc., Troy, MI (US)

( * ) Notice: Subject to any disclaimer, the term of this patent is extended or adjusted under 35 U.S.C. 154(b) by 440 days.

(21) Appl. No.: 10/283,095

(22) Filed: Oct. 30, 2002

(65) Prior Publication Data

US 2004/0085316 A1    May 6, 2004

(51) Int. Cl.
*G06T 11/20* (2006.01)
*G09G 5/22* (2006.01)

(52) U.S. Cl. .................... 345/440; 345/440.2
(58) Field of Classification Search ............ 345/440, 345/440.1, 440.2; 717/132; 379/29.1; 463/31; 715/700, 754, 773, 780–783, 856, 864, 903, 715/961, 964, 968, 970, FOR. 184, FOR. 193–195; 718/105, 108, 132
See application file for complete search history.

(56) References Cited

OTHER PUBLICATIONS

Merriam Webster, Merriam Webster's Collegiate Dictionary, Tenth Edition © 1997, pp. 310 and 591.*
Microsoft Excel, Microsoft Excel 2000, (c) 2000, pages embedded in Office Action.*

* cited by examiner

*Primary Examiner*—Kee M. Tung
*Assistant Examiner*—Gregory F. Cunningham
(74) *Attorney, Agent, or Firm*—Kenyon & Kenyon LLP (57) ABSTRACT

A system and method of facilitating data visualization provides for receiving a user response to a data entry interface via a network, where the user response defines a first data set and a second data set. Data points in the first and second data sets include dependent variable values. A first chart is generated based on the first data set and a second chart is generated based on the second data set. An appearance of the second chart is modified if a user-selected area of the first chart corresponds to a first data point in the first data set and the first data point has a predetermined relationship with a second data point in the second data set.

27 Claims, 14 Drawing Sheets

INTERACTIVE DATA VISUALIZATION AND CHARTING FRAMEWORK WITH SELF-DETECTION OF DATA COMMONALITY

BACKGROUND

1. Technical Field

Embodiments of the present invention relate to facilitating data visualization. More particularly, the embodiments relate to a dynamic approach to facilitating visualization of different data points presented through several charts by simultaneous highlighting of data points that are linked through a common variable.

2. Discussion

Graphics are an extremely effective way to communicate information, and a variety of graphical charts have been developed to visualize data. Some of the more popular graphic chart types are pie charts, vertical bar charts, horizontal bar charts, data plot charts, line trend charts, bubble charts, and so on. Each of these chart types displays data in a different manner in an attempt to improve data visualization and user recognition of data relationships. Such graphical charts have been adopted by many different software systems that deal with data visualization.

While the above approaches have been acceptable under certain circumstances, a number of difficulties remain. For example, when dealing with multiple-chart displays, conventional approaches are generally static with regard to the user interface. In other words, traditional approaches merely present the charts in a predefined manner and provide the user with little interactivity when viewing the charts. Furthermore, the ability to identify related data between the charts is significantly limited. As a result, it can be difficult for the user to recognize relationships between the data represented by the charts in real-time.

While limited attempts have been made at increasing the interactivity of data visualization, these approaches typically have "hard-wired" settings with regard to the data being represented as well as the associated visual parameters. In fact, none of the web-based approaches to interactive charting enable the user to provide the dependent variable data to be charted. Rather, the user requests data by entering independent variable values (such as stock ticker symbols), and the system retrieves the dependent variable values (e.g., stock prices) from another source. Thus, it is quite difficult to change the charted data on-the-fly or to modify the colors, legends, ranges, etc. as desired. As a result, conventional attempts at dynamically representing data often have reduced flexibility and limited usefulness across applications.

There is therefore a need for a system and method that allows a user to create multiple charts for various sets of data points, while responding to the user dynamically. Such a capability would be of great help in dealing with large sets of data points across multiple charts on a single computer screen. There is also a need to have built-in rules within the system to identify relevant data points, and to have the added flexibility of the user interactively modifying the identification rules in real-time.

BRIEF DESCRIPTION OF THE DRAWINGS

The various advantages of embodiments of the present invention will become apparent to one skilled in the art by reading the following specification and appended claims, and by referencing the following drawings, in which:

DETAILED DESCRIPTION

Figure 3:
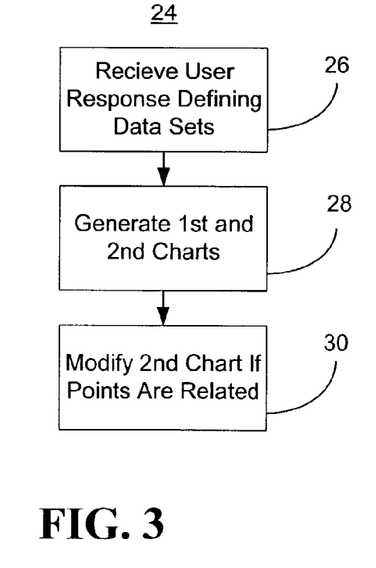
FIG. 3 is a flowchart of an example of a method of facilitating data visualization according to one embodiment of the invention.

FIG. 3 shows one approach to facilitating data visualization at method 24. Processing block 26 provides for receiving a user response to a data entry interface via a network, where the user response defines a first data set and a second data set. Data points in the first and second data sets include dependent variable values. Data entry can be implemented manually by the user or through the use of data migration tools and a user-specified database. Block 28 provides for generating a first chart based on the first data set and a second chart based on the second data set. An appearance of the second chart is modified at block 30 if a user-selected area of the first chart corresponds to a first data point in the first data set and the first data point has a predetermined relationship with a second data point in the second data set.

Figure 4:
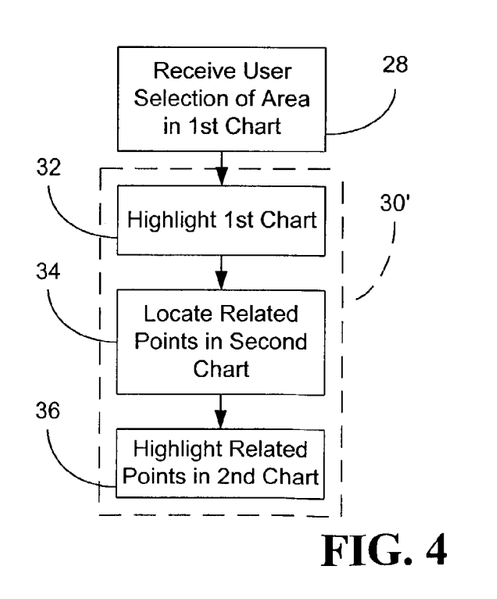
FIG. 4 is a flowchart of an example of a process of modifying an appearance of a chart according to one embodiment of the invention.

FIG. 4 demonstrates one approach to modifying the appearance of the second chart in greater detail at block 30'. Specifically, a first highlighted area is generated in the first chart at block 32, and the second point is located in the second data set at block 34 based on a determination of whether the first data point has the predetermined relationship with the second data point. If the second data point can be located, block 36 provides for generating a second highlighted area in the second chart.

Figure 5:
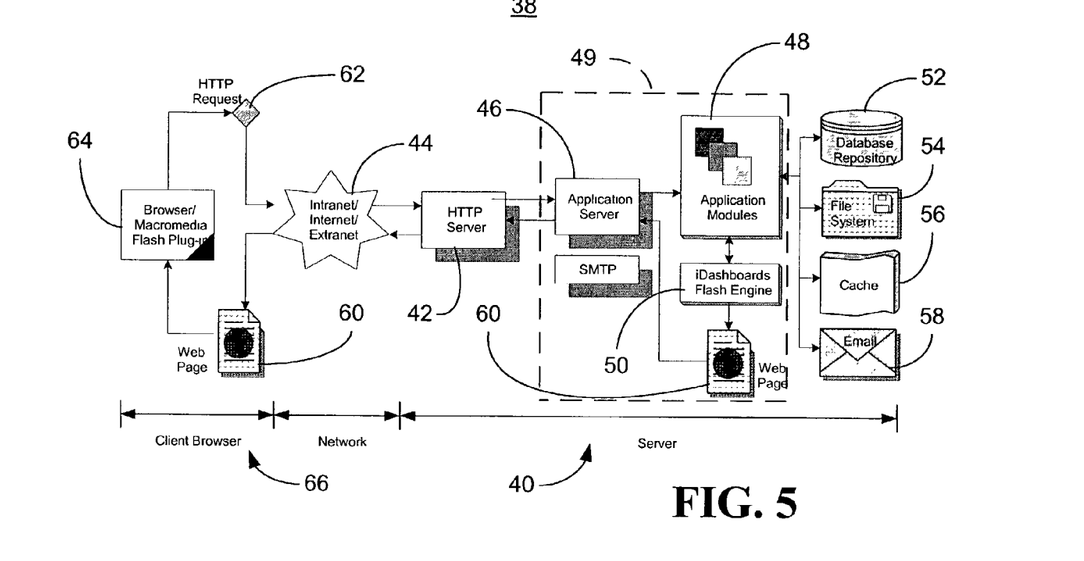
FIG. 5 is a diagram of an example of an example of a networking architecture according to one embodiment of the invention.

Turning now to FIG. 5, a networking architecture 38 that implements the embodiments is shown. Generally, the architecture 38 is partitioned into a client browser 66, a network 44 and a server (or system) 40. System 40 includes a hypertext transfer protocol (HTTP) server 42, which interfaces with network 44, and an application server 46, which interfaces with any number of application modules 48 and the HTTP server 42. A processor 49 executes a flash engine 50 and is operatively coupled to a number of supporting components through the application modules 48. The supporting components include a database depository 52, a machine readable storage medium such as file system 54, cache memory 56 and e-mail module 58. The flash engine 50 generates web pages 60 in order to satisfy HTTP requests 62, which are generated by a flash plug-in 64 running on client browser 66. The web pages 60 can include the various charts and interfaces described herein, and comply with the well documented HTTP standard (Internet Engineering Task Force—IETF). Thus, architecture 38 provides a unique web-based approach to data visualization.

Figure 6:
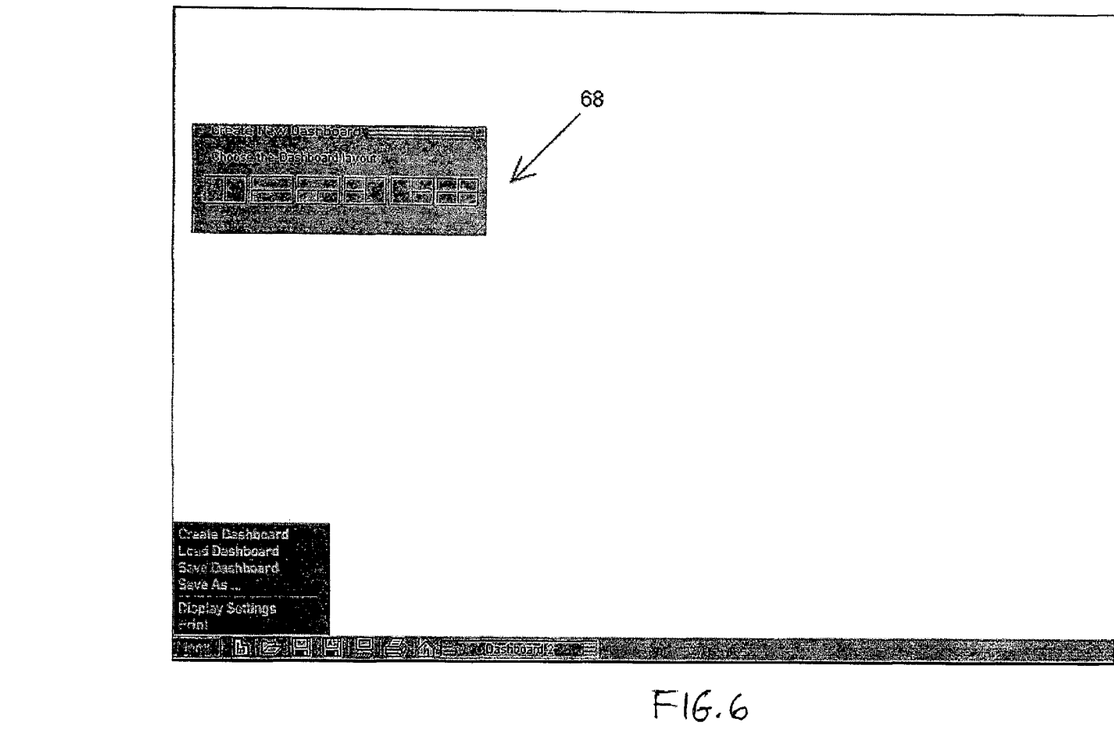
FIG. 6 is a screen print of an example of a framework selection interface according to one embodiment of the invention.
Figure 7:
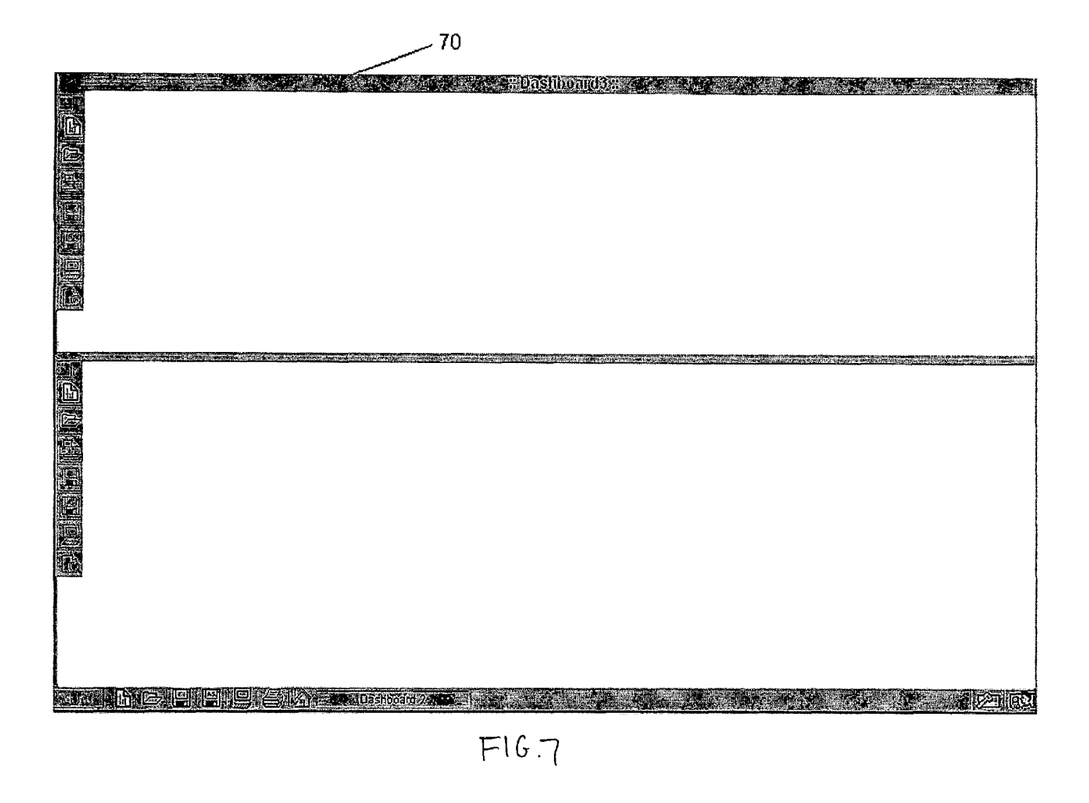
FIG. 7 is a screen print of an example of a framework layout according to one embodiment of the invention.

FIG. 6 shows a charting framework selection interface 68, wherein the user may select 2-chart areas, 3-chart areas, and 4-chart areas from the interface 68. Generally, the interface 68 is generated and transmitted toward the user via the network. The charts may therefore be generated based on the user response to the interface 68. Furthermore, the user response to the interface 68 can be stored to a database. FIG. 7 demonstrates a 2-board framework 70 with a horizontal split.

Figure 8:
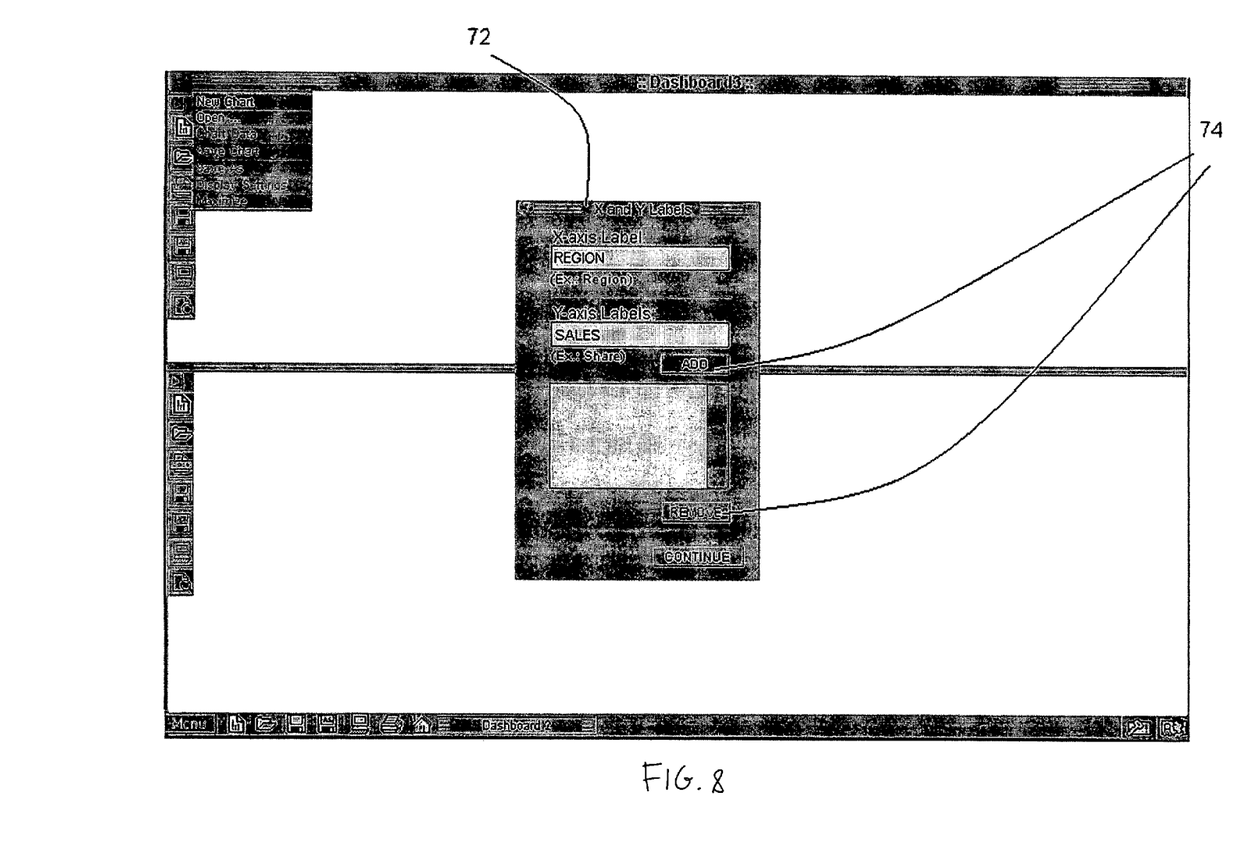
FIG. 8 is a screen print of an example of a label entry interface according to one embodiment of the invention.

Turning now to FIG. 8, a label entry interface 72 is shown. As in the case of many of the interfaces described herein, interface 72 can be generated and transmitted toward the user via the network. The variable labels are assigned based on the user response to the label entry interface 72. In the illustrated example, the independent variable label is "Region" and the dependent variable label "Sales". It will be appreciated that multiple dependent variable labels can be created and/or removed through manipulation of buttons 74.

Figure 9:
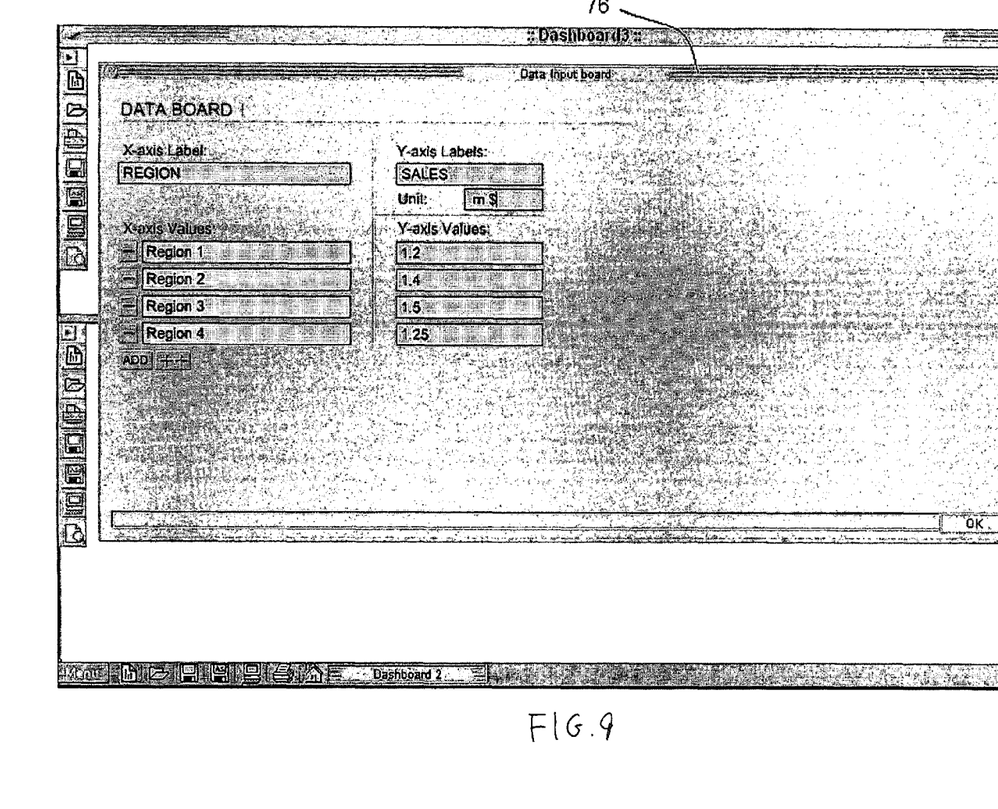
FIG. 9 is a screen print of an example of a data entry interface according to one embodiment of the invention.

FIG. 9 demonstrates one approach to a data entry interface 76 wherein the user is able to define data sets. It can be seen that data points include dependent variable values as well as independent variable values. This capability represents a significant improvement over the hard-wired approaches to data visualization. The data points may also be obtained by using any commercially available data migration application to access one or more user-specified databases, which are ultimately stored in the database repository 52 (FIG. 5) or elsewhere on the network. A data point includes an independent variable value and at least one dependent variable value. Each variable is given a label, which defines the type of data to be displayed. In the illustrated example, the independent variable is given the label "Region" and values of "Region 1", "Region 2", "Region 3", and "Region 4". The dependent variable values are 1.2, 1.4, 1.5 and 1.25, where the dependent variable is given the label of "sales". It should be noted that the illustrated "ADD" and "++" buttons enable the user to increase the number of rows in increments of one or multiple rows, respectively. Similarly, the "--" buttons adjacent to each row enable the user to decrease the number of rows based on the size of the corresponding data set.

Figure 10:
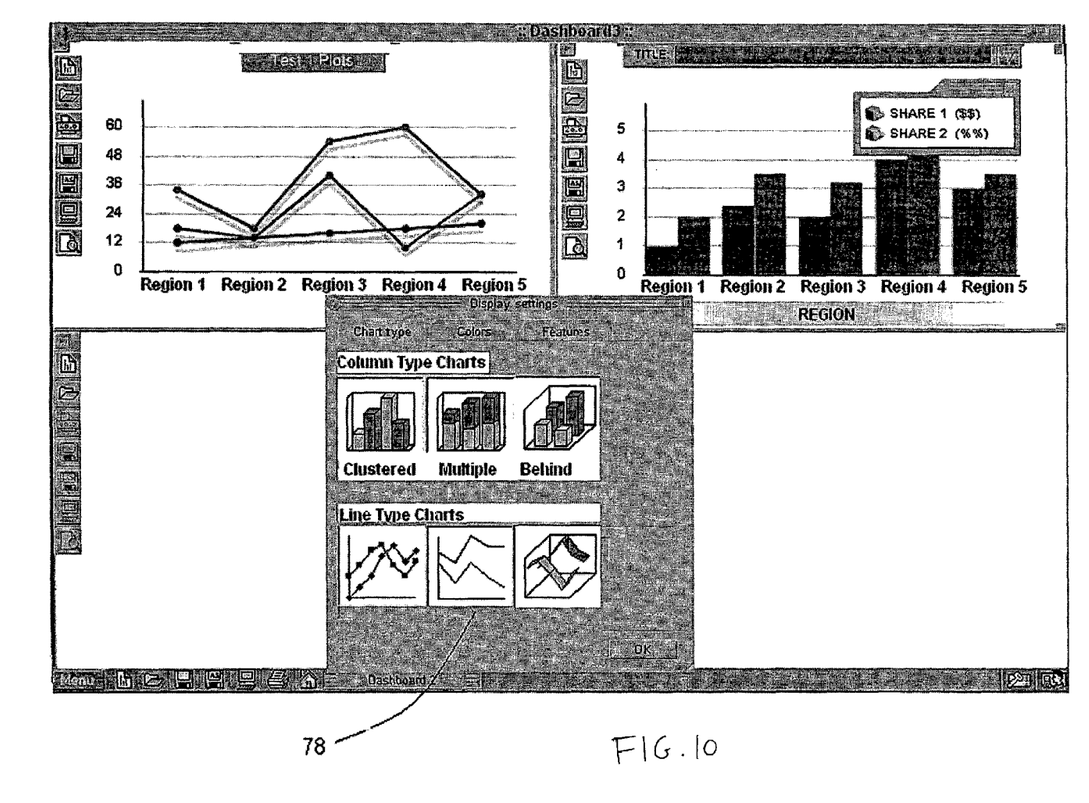
FIG. 10 is a screen print of an example of a chart type selection interface according to one embodiment of the invention.

FIG. 10 illustrates one approach to generating a chart type selection interface 78, which enables the user to specify the type of chart to be used for a given set of data. While the illustrated example includes column type charts and line type charts, it should be noted the embodiments are not so limited. Indeed, any type of chart, including tabular and pie charts, can be provided in the chart type selection interface 78.

Figure 11:
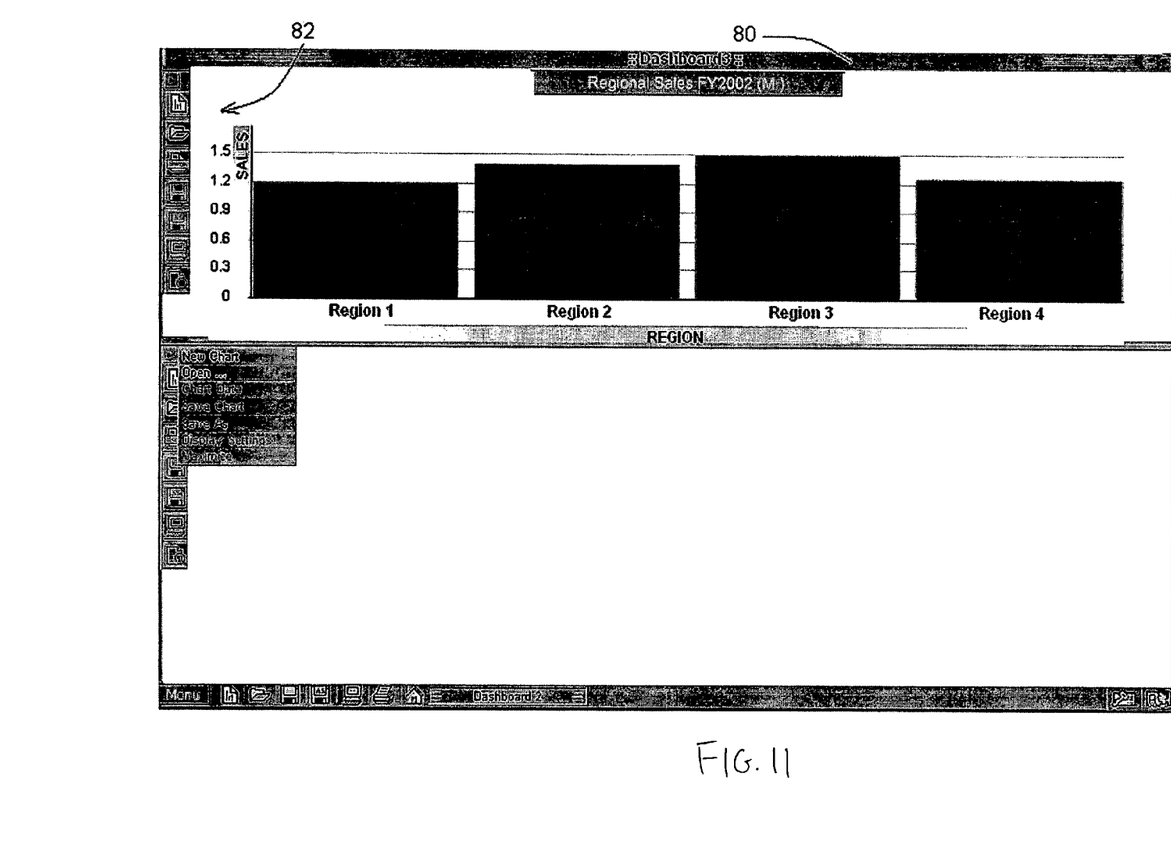
FIG. 11 is a screen print of an example of a framework having a chart displayed in the upper frame according to one embodiment of the invention.
Figure 12:
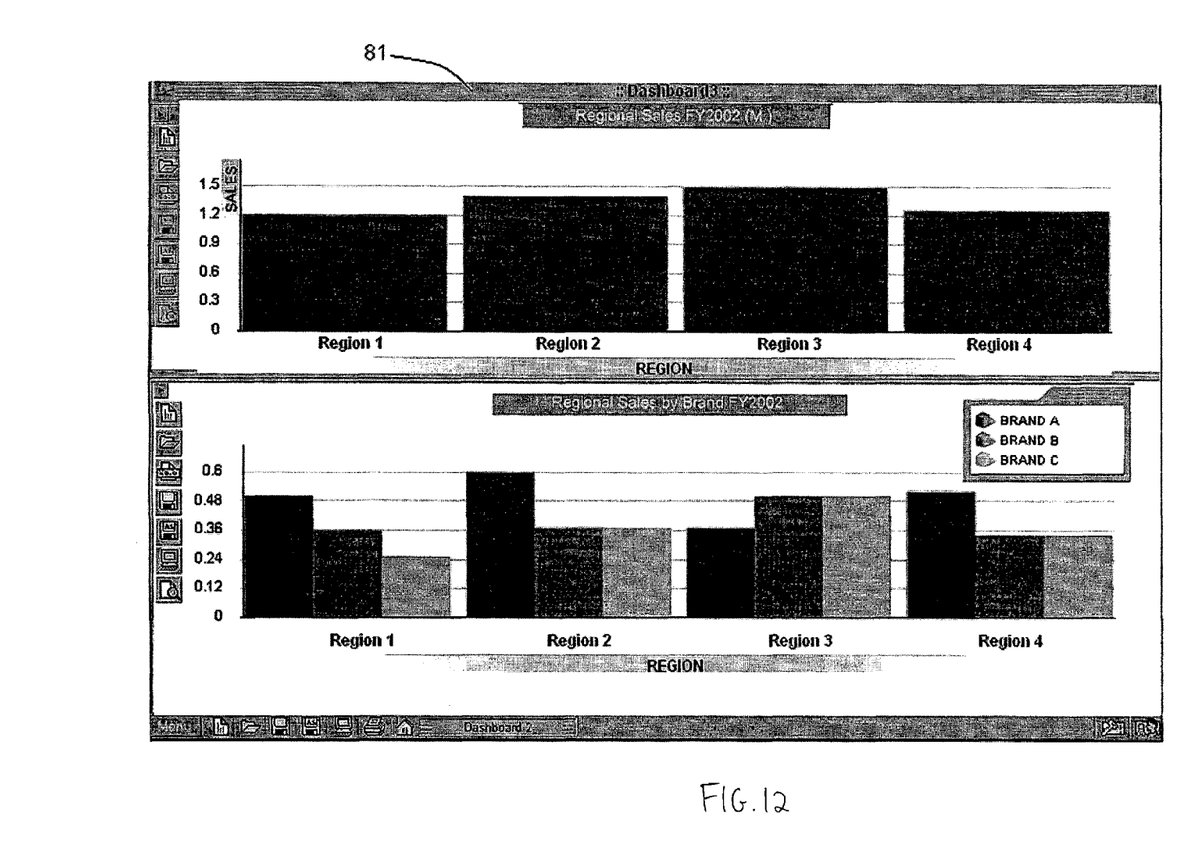
FIG. 12 is a screen print of an example of a framework with charts displayed in both frames according to one embodiment of the invention.
Figure 13:
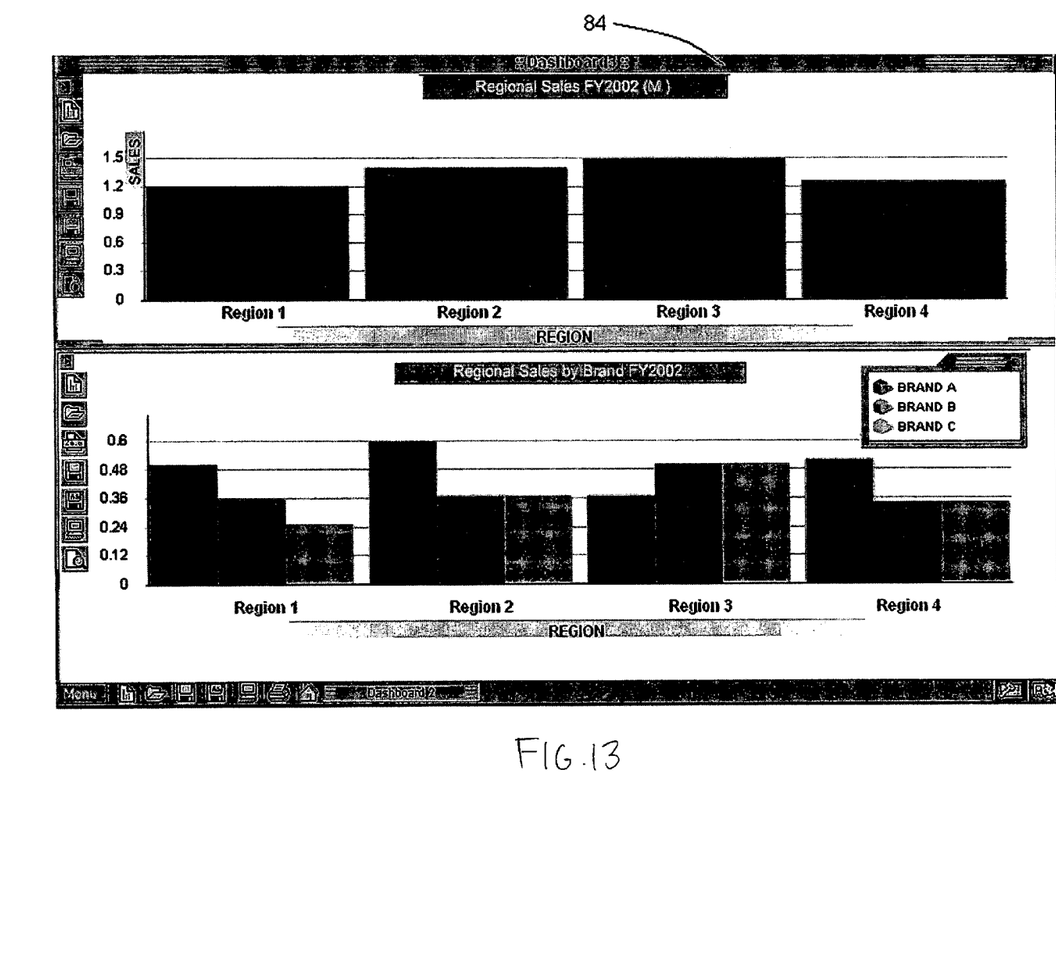
FIG. 13 is a screen print of an example of a framework with the configuration icons removed from the frame according to one embodiment of the invention.

Turning now to FIG. 11, framework 80 illustrates a vertical bar chart being displayed in an upper frame of a horizontally split 2-frame framework. It can be seen that a set of configuration icons 82 are included in the frame to assist the user in modifying settings, opening charts, saving charts, etc. FIG. 12 demonstrates a framework 81 having a vertical bar chart in each of the frames of a horizontally split framework. It should be noted that the chart in the lower frame has three dependent variables (i.e., sales for three brands) to be drawn against the same independent variable (i.e., sales region). It should also be noted that each frame has a dedicated set of configuration icons to provide maximum flexibility in designing the appearance of the charts. It is important to note that this flexibility is imparted to the user as opposed to being rigidly defined by the system. FIG. 13 shows a framework 84 having the configuration icons removed from the frames based on a user request, which is made through the display control features within the system.

Figure 14:
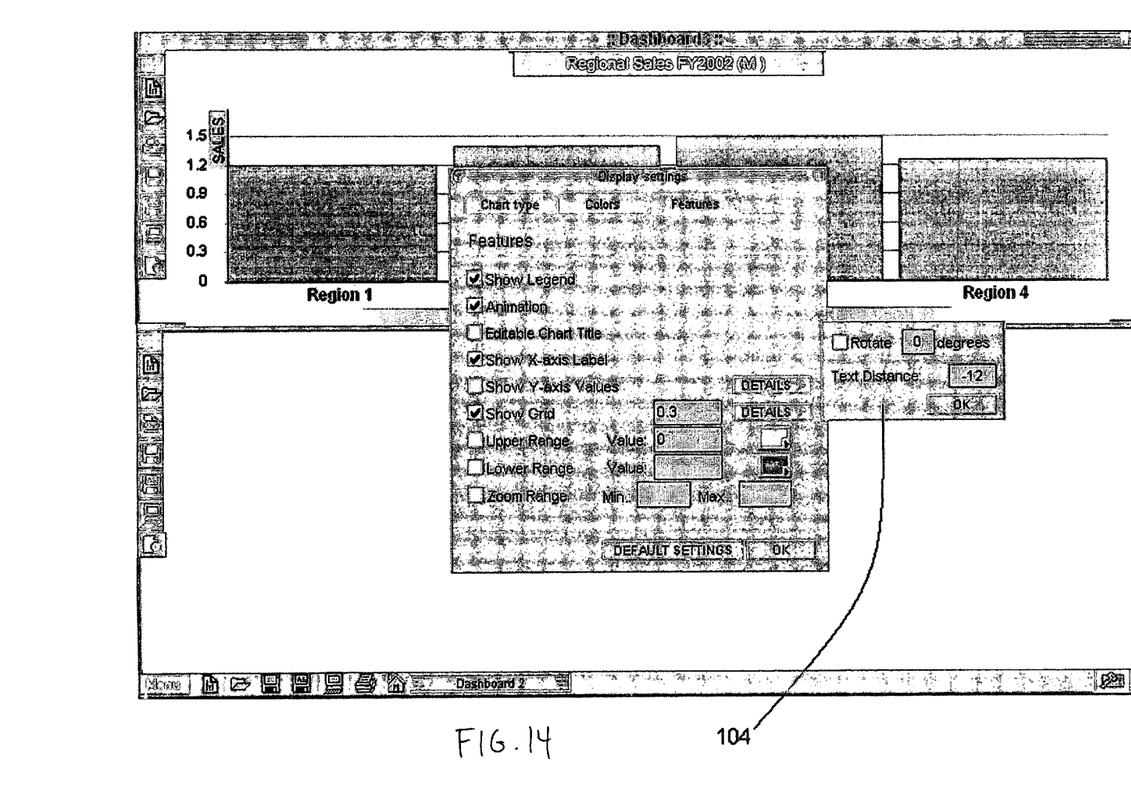
FIG. 14 is a screen print of an example of the highlighting of related data points across multiple charts according to one embodiment of the invention.

FIG. 14 demonstrates a framework 86 having enhanced data visualization. Specifically, a first chart is generated in frame 90 based on a first data set and a second chart is generated in frame 88 based on second data set as already discussed. It can also be seen, however, that an appearance of the second chart is modified if a user-selected area of the first chart corresponds to a first data point in the first data set and the first data point has a predetermined relationship with a second data point in the second data set. For example, if the user points the cursor to the "Region 1" independent variable value in the chart of frame 90, a first highlighted area 94 is generated in the chart of frame 90 and a second highlighted area 92 is generated in the chart of frame 88. By so modifying the appearance of the chart in frame 88, the framework 86 is better able to assist the user in identifying data relationships.

One approach to modifying the appearance of the chart in frame 88 involves locating additional data points in the second data set based on a determination of whether the first data point has the predetermined relationship with the additional data points. For example, the three data points associated with the first highlighted area 94 are related to the data point associated with the second highlighted area 92. In the illustrated example, the relationship is identified by matching the "Region 1" independent variable value of the chart in frame 90 with the "Region 1" independent variable value of the chart in frame 88. Thus, one approach is to determine whether the first data point has an independent variable value that matches an independent variable value of the second data point. If so, the independent variable value of the second data point can be highlighted.

It will be appreciated that a determination can also be made as to whether the first data point has a dependent variable value that matches a dependent variable value of the second data point. Another approach would be to determine whether the first data point has a dependent variable label that matches an independent variable value of the second data point. By way of example, if a user draws a vertical bar chart using data points indicating sales for four brands (Brand A, Brand B, Brand C, Brand D), and a line chart which has monthly sales figures for 6 months for each of those four brands, the entire line that indicates the Brand A could be highlighted if the user moves the cursor on the Brand A bar in the bar chart. Although the independent variable values (descriptions of each month—January, February, etc.) for the line chart don't match the independent variable values (in this case—Brand A, Brand B, etc.) for the bar chart, linking is still possible. Thus, as long as the name (or label) of each set of dependent variables (the Y-coordinates) for the line chart matches with the independent variable values (Brand A, Brand B, etc.) of the bar chart, a user may configure the line chart to be identified with corresponding regions on the bar chart.

Figure 15:
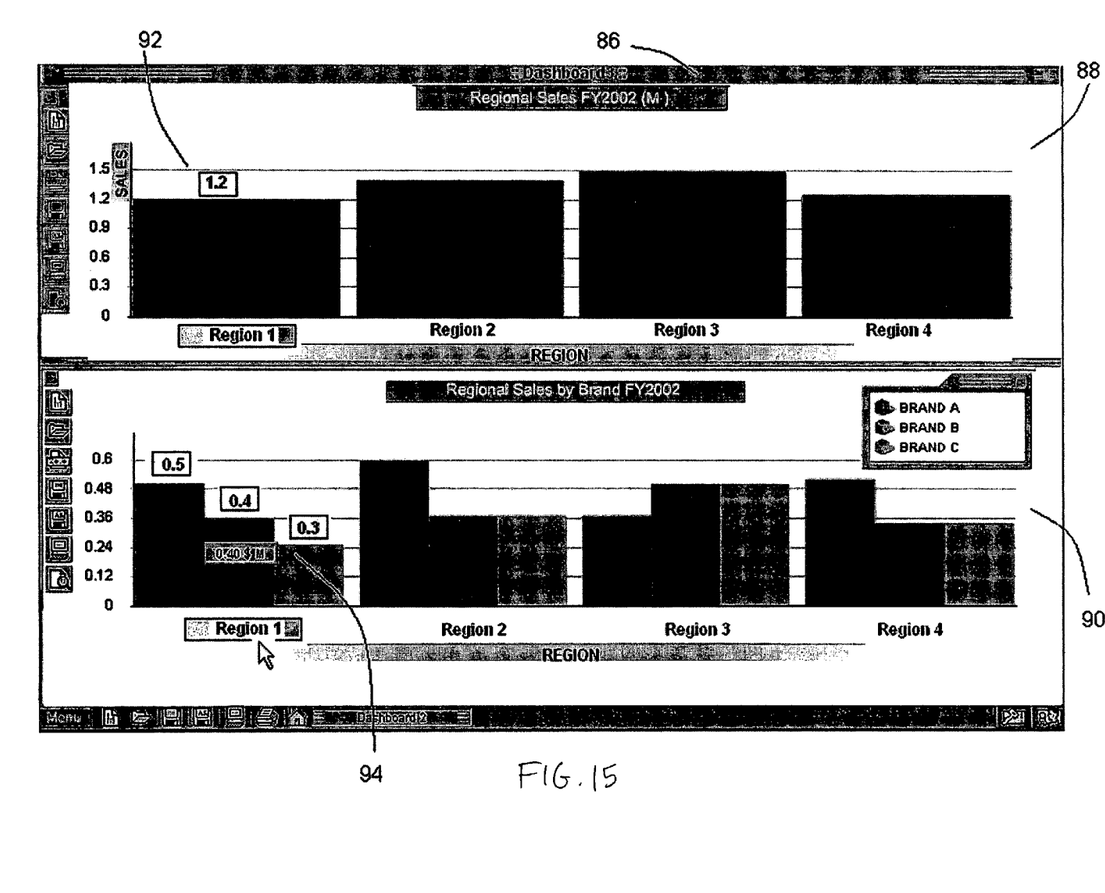
FIG. 15 is a screen print of an example of the highlighting of related data points across multiple charts according to another embodiment of the invention.

Simply put, although the charts in each of the frames were drawn independent of each other, the data points charted within each of the frames sharing a common framework can interact with each other through built-in identification rules of detecting the commonality of data. If a user were to place the cursor on a chart of either frame, all other points and parts of a chart in the interface are also highlighted. By way of further example, FIG. 15 shows a framework 96 wherein the user positions the cursor near the "Region 3" independent variable value of the chart in frame 98. The system locates the three data points associated with the "Region 3" independent variable value of the chart in frame 100 and highlights these data points.

Figure 16:
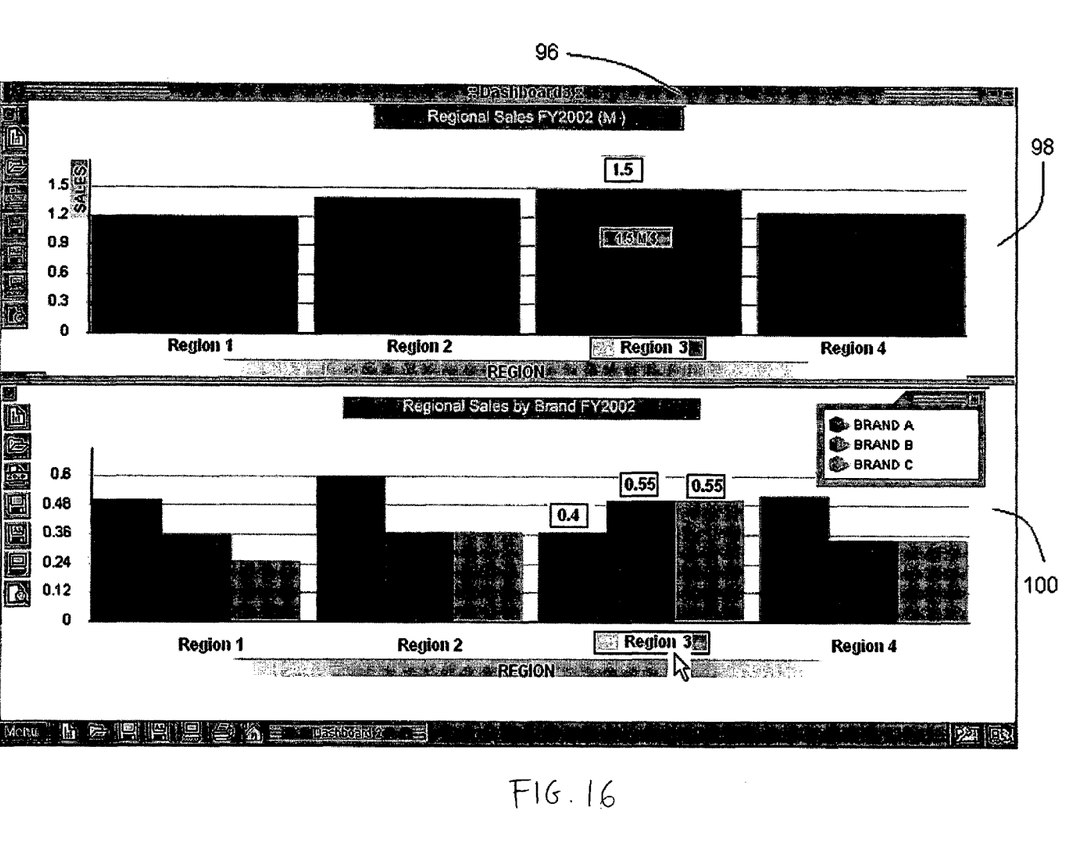
FIG. 16 is a screen print of an example of a color selection interface according to one embodiment of the invention.
Figure 17:
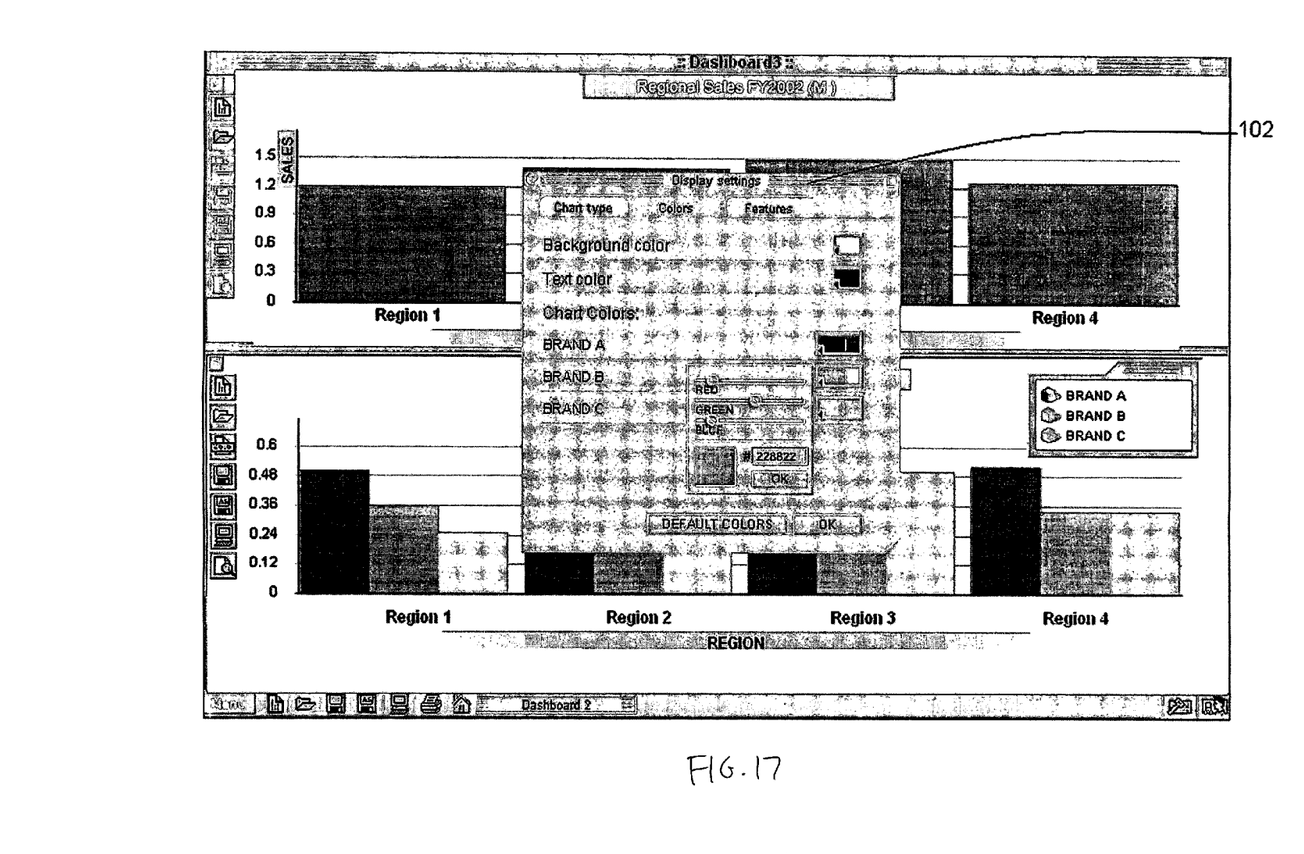
FIG. 17 is a screen print of an example of a text rotation interface according to one embodiment of the invention.

Turning now to FIG. 16, one approach to generating a color selection interface 102 is shown. The user is able to define bar colors, background color and text color for each chart. It should be noted that the system is able to store the user's responses to the color selection interface 102 to a database for future retrieval. FIG. 17 shows one approach to a text rotation interface 104, which enables the user to rotate text that is too long for the visual appearance of the particular type of chart. It should be noted that all user responses to interfaces can be stored to a database in order to provide an "profile" effect and ease repetitive viewing. Furthermore, a write privilege can be associated with a user where the write privilege enables the user to modify data stored in the database. Other users without the write privilege, however, may only view the resulting framework.

Thus, embodiments of the present invention provide a visual display framework and user-interactive software system for more intuitively presenting data through detection of common data points on a computer screen and highlighting them all when a user takes the computer cursor (or similar highlighting mechanism, e.g., touchscreen implementation) to any one of those data points. Such a visual presentation is more meaningful and beneficial in many cases of data analysis. This approach allows a user-interactive data input and data display framework to function in an Internet browser (such as Microsoft® Internet Explorer® or Netscape®) and be accessed through the Internet, secured Intranet or Extranet.

Figure 1:
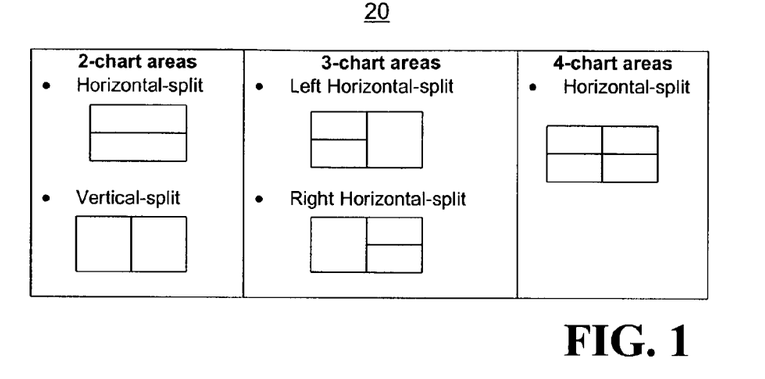
FIG. 1 is a diagram of an example of available charting frameworks according to one embodiment of the invention.

Embodiments can have the capability to display multiple charts on a single screen and allow the users to select any framework of their choice. Each framework could have multiple chart areas (or frames). The application is configured to provide different layouts for the chart areas. Some of the options for various framework layouts shown in the diagram 20 of FIG. 1.

Embodiments can also provide the user with the option of inputting the data through an intuitive data entry interface. Alternatively, data can be imported from a user-specified database using commercially available data migration tools. Such data entry allows user to provide descriptions as well as values of the independent and dependent variables (commonly denoted as X and Y variables) that need to be displayed through the charts. A chart selection interface also enables the user to select different types of charts to be created from the data. Thereafter, the system lets the user interact with the chart by moving the computer cursor around the screen (e.g., using the computer mouse or similar cursor-control device). Whenever the cursor is positioned on a point or a displayed chart area, all other points on the computer screen that are related with that point can be highlighted to create a robust visual aid.

Figure 2:
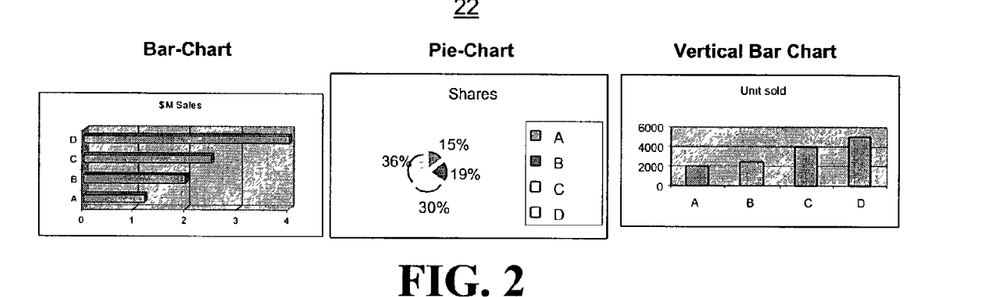
FIG. 2 is a diagram of an example of available chart types according to one embodiment of the invention.

For example, if the user moves the computer cursor near independent variable value A in any one of the charts 22 in FIG. 2, the other charts with data matching value A can also be highlighted while displaying the particular data values. If the same variable value is not present on a given chart, that chart would not be modified.

This approach can be applied to all types of charts (including tables). For example, if a user moves the computer cursor over a data point on a table on the screen, other charts displayed in various frames are highlighted with the corresponding data point variable. Thus, the tabular data display can also be synchronized.

The embodiments can also have an intuitive color selection interface to change the display colors on the chart, where the interface associates different colors for background, text, and various data sets with the corresponding area on the chart. The system can assume default color values for different sets of data coordinates charted if the user doesn't provide specific colors associated with each sets of data coordinates. The embodiments put no limit on the number of times a user may change the display settings and redraw the chart. This ability improves user-interactivity with the system. The software system also has the option of removing the visibility of the dividing borders and icons displayed within a given frame.

Each chart or table displayed within the frame can be linked to other charts for data "drill-down" or "drill-up". This link could be activated by a user simply clicking a visible link or designated chart area on the displayed chart of table. By clicking, a totally different chart is retrieved within the framework in place of the displayed chart or table. In addition, charts within the framework need not be affected. The detection of common points would still work within the existing charts being displayed, and the newly retrieved chart.

The embodiments also allow the user to save the chart along with a particular set of data values, associated colors and settings for chart display. All this information can be saved into a database that supports the overall system. The supporting database can be any commercially available relational database system (from any database vendor) that complies with relational database management system or multi-dimensional database system. However, such a database is not essential for the chart interface to work. Absence of such a database merely limits the ability to save user values for future retrieval. The system may still provide, however, the interactive data input and display the chart per the input data and display options provided.

The software system also has the ability to be configured such that a user can save the data values display ranges and color options for displaying in the charts, in a manner that prevents other users from overwriting changes to such values. Such users who have "view only" privileges could therefore only view the charts for which values have been provided by other users, where the other users have greater system control. This feature can make use of the database functionality discussed above.

Those skilled in the art can now appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A method of facilitating data visualization at a display unit of a computing device, comprising:

receiving a user response to a data entry interface via a computer network, the user response defining a first data set and a second data set, data points in the first and second data sets including dependent variable values;

generating a first chart in a first frame based on the first data set and a second chart in a second frame based on the second data set; and receiving a user-controlled position of a cursor in the first chart, the position of the cursor corresponding to a first data point in the first data set;

determining a correspondence relationship between the first data point and at least one data point in the second data set; and modifying an appearance of the second chart to highlight the correspondence relationship between the at least one second data point in the second chart and the first data point as determined solely by the user-controlled position of the cursor in the first chart.

2. The method of claim 1 further including simultaneously generating a first highlighted area in the first chart and a second highlighted area in the second chart, the first highlighted area corresponding to the first data point and the second highlighted area corresponding to the at least one second data point, the highlighting being automatically performed by the computing device and displayed on the display unit.

3. The method of claim 2 further including locating the at least one second data point in the second data set based on a determination of whether the first data point has the correspondence relationship with the at least one second data point.

4. The method of claim 3 further including:

determining whether the first data point has an independent variable value that matches an independent variable value of the at least one second data point by comparing an independent variable value of the first data point with independent variable values of the second data set; and automatically highlighting the independent variable value of the at least one second data point.

5. The method of claim 3 further including:

determining whether the first data point has a dependent variable value that matches a dependent variable value of the at least one second data point by comparing a dependent variable value of first data point with dependent variable values of the second data set; and automatically highlighting the dependent variable value of the at least one second data point.

6. The method of claim 3 further including:

determining whether the first data point has a dependent variable label that matches an independent variable value of the at least one second data point by comparing a dependent variable data label of first data point with independent values of the second data set; and automatically highlighting the independent variable value of the second data point.

7. The method of claim 3 further including:

locating additional data points in the second set of data based on a determination of whether the first data point corresponds with the additional data points by comparing an independent value of first data point with independent value on the second data set; and automatically generating highlighted areas for each of the additional data points.

8. The method of claim 2 further including determining that the user has positioned a cursor within a predefined distance proximate to the first highlighted area.

9. The method of claim 1 further including transmitting the charts to the data entry interface via the network.

10. The method of claim 1 further including:

generating a chart type selection interface;

transmitting the chart type selection interface to the data entry interface via the network;

generating the charts based on a user response to the chart type selection interface; and storing the user response to the chart type selection interface to a database.

11. The method of claim 10 wherein the charts include at least one of a pie chart, a bar chart, and a table.

12. The method of claim 10 further including associating a write privilege with the user, the write privilege enabling the user to modify data stored in the database.

13. The method of claim 10 further including:

generating a color selection interface;

transmitting the color selection interface to the data entry interface via the network;

generating the chart based on a user response to the color selection interface; and storing the user response to the color selection interface to the database.

14. The method of claim 1 further including:

generating the data entry interface; and transmitting the data entry interface to the data entry interface via the network.

15. The method of claim 1 further including storing the first data set and the second data set to a database.

16. A method of facilitating data visualization at a display unit of a computing device, the method comprising:

receiving a user response to a data entry interface via a computer network, the user response defining a first data set and a second data set, the first and second data sets including dependent variable values;

generating a first chart based on the first data set and a second chart based on the second data set;

storing the first data set and the second data set to a database;

receiving a user selection of an area of the first chart solely based on a position of a cursor;

determining whether the selected area corresponds to a first data point in the first set of data set;

generating a first highlighted area in the first chart if the selected area corresponds to the first data point;

locating a second data point in the second data set based on a determination of whether the first data point has a predetermined relationship with the second data point; and simultaneously generating a second highlighted area in the second chart if the first data point has the predetermined relationship with the second data point, the second highlighted area corresponding to the second data point.

17. The method of claim 16 further including:
determining whether the first data point has an independent variable value that matches an independent variable value of the second data point; and
highlighting the independent variable value of the second data point.

18. The method of claim 16 further including:
determining whether the first data point has a dependent variable value that matches a dependent variable value of the second data point; and
highlighting the dependent variable value of the second data point.

19. The method of claim 16 further including:
determining whether the first data point has a dependent variable label that matches an independent variable value of the second data point; and
highlighting the independent variable value of the second data point.

20. The method of claim 16 further including determining that the user has positioned a cursor within a predefined distance proximate to the first highlighted area.

21. The method of claim 16 further including transmitting the charts to the data entry interface via the network.

22. A system comprising:
a processor; and
a machine readable medium operatively coupled to the processor, the medium including a set of stored instructions capable of being executed to receive a user response to a data input interface via a network connection, and a user-controlled position of a cursor, where the user response is to define a first data set and a second data set, where data points in the first and second data sets including dependent variable values, the instructions further capable of being executed to generate a first chart in a first frame based on the first data set and a second chart in a second frame based on the second data set, and modify an appearance of the second chart if a user-selected area of the first chart, as determined solely by the position of the cursor, corresponds to a first data point in the first data set and the first data point has a predetermined relationship with a second data point in the second data set.

23. The system of claim 22 wherein the stored instructions are further capable of being executed to simultaneously generate a first highlighted area in the first chart and a second highlighted area in the second chart, the first highlighted area corresponding to the first data point and the second highlighted area corresponding to the second data point, the highlighting being automatically performed by the computing device and displayed on the display unit.

24. The system of claim 23 wherein the stored instructions are further capable of being executed to locate the second data point in the second data set based on a determination of whether the first data point has the predetermined relationship with the second data point.

25. A method of facilitating data visualization at a display unit of a computing device, comprising:
receiving first data dependent upon an independent variable;
receiving second data dependent on said independent variable;
generating first and second graphs of the first and second data in first and second frames, respectively;
receiving a user-controlled position of a cursor; and
determining the independent variable value solely by said position of the cursor in either the first or second graph;
simultaneously highlighting portions of the first and second graphs sharing the independent variable value, as determined solely by the user-controlled position of the cursor in either the first or second graph.

26. The method of claim 25, further comprising:
determining a dependent variable value at the position of the cursor in either the first or second graph;
simultaneously highlighting portions of the first and second graphs sharing the dependent variable value.

27. The method of claim 25, further comprising:
assigning a label to each value of the second data, the label corresponding to values of the independent variable of the first data;
determining the second data having labels that correspond to the independent variable at the position of the cursor in the first graph;
highlighting a data set in the second graph including the determined second data.

* * * * *